(12) United States Patent
Hirth et al.

(10) Patent No.: US 9,289,948 B2
(45) Date of Patent: Mar. 22, 2016

(54) RECEPTACLE WITH MOUNT FEATURE

(71) Applicant: TI Automotive Technology Center GmbH, Rastatt (DE)

(72) Inventors: Karsten Hirth, Gaggenau (DE); Michael Kunz, Ettlingen (DE)

(73) Assignee: TI Automotive Technology Center GmbH, Rastatt (DE)

( * ) Notice: Subject to any disclaimer, the term of this patent is extended or adjusted under 35 U.S.C. 154(b) by 469 days.

(21) Appl. No.: 13/961,455

(22) Filed: Aug. 7, 2013

(65) Prior Publication Data

US 2013/0323346 A1    Dec. 5, 2013

Related U.S. Application Data

(63) Continuation-in-part of application No. 13/116,390, filed on May 26, 2011, now abandoned.

(51) Int. Cl.
| | |
|---|---|
| *B29C 69/00* | (2006.01) |
| *B29C 49/48* | (2006.01) |
| *B29C 49/50* | (2006.01) |
| *B29C 49/54* | (2006.01) |
| *B29C 49/74* | (2006.01) |
| *B29C 49/76* | (2006.01) |
| *B29L 31/00* | (2006.01) |
| *B29C 49/22* | (2006.01) |
| *B29L 9/00* | (2006.01) |

(52) U.S. Cl.
CPC ............. *B29C 69/00* (2013.01); *B29C 49/4802* (2013.01); *B29C 49/4815* (2013.01); *B29C 49/50* (2013.01); *B29C 49/54* (2013.01); *B29C 49/74* (2013.01); *B29C 49/76* (2013.01); *B29C 49/22* (2013.01); *B29L 2009/00* (2013.01); *B29L 2031/7172* (2013.01)

(58) Field of Classification Search
CPC .. B29C 49/4802; B29C 49/4815; B29C 69/00
See application file for complete search history.

(56) References Cited

U.S. PATENT DOCUMENTS

| | | | |
|---|---|---|---|
| 3,821,344 | A | 6/1974 | Peters |
| 3,915,611 | A | 10/1975 | Peters |

(Continued)

FOREIGN PATENT DOCUMENTS

| | | |
|---|---|---|
| EP | 2527126 A2 | 11/2012 |
| FR | 2314814 A1 | 1/1977 |

(Continued)

OTHER PUBLICATIONS

European Search Report mailed Oct. 11, 2013, 8 pages.

(Continued)

*Primary Examiner* — James Sanders
(74) *Attorney, Agent, or Firm* — Brinks Gilson & Lione

(57) ABSTRACT

A method for forming a receptacle may include providing a mold having a forming surface and a recessed area defining part of the forming surface, the mold having sections that may be separated to open the mold and closed together to close the mold. A molten plastic parison may be provided into the mold when the mold is open, the mold may be closed and the parison may be expanded against the forming surface so that a portion of the parison enters the recessed area. The portion of the parison within the recessed area may be formed by moving a secondary forming feature relative to the mold and parison to define a mount feature.

8 Claims, 7 Drawing Sheets

(56) References Cited

U.S. PATENT DOCUMENTS

| | | |
|---|---|---|
| 4,017,250 A | 4/1977 | Chang et al. |
| 5,454,708 A | 10/1995 | Boenig et al. |
| 6,083,450 A | 7/2000 | Safian |
| 6,375,891 B1 | 4/2002 | Nishikawa |
| 6,651,707 B2 | 11/2003 | Zimmer et al. |
| 7,565,986 B2 | 7/2009 | Brandner et al. |
| 7,704,440 B2 | 4/2010 | Brandner et al. |
| 2003/0102605 A1 | 6/2003 | Rutenbeck et al. |
| 2004/0121097 A1 | 6/2004 | Nahill et al. |
| 2008/0047964 A1 | 2/2008 | Denner et al. |
| 2009/0202766 A1 | 8/2009 | Beuerle et al. |
| 2009/0324866 A1 | 12/2009 | Bocker et al. |
| 2012/0301568 A1 | 11/2012 | Hirth et al. |

FOREIGN PATENT DOCUMENTS

| | | |
|---|---|---|
| JP | S63242723 | 10/1988 |
| JP | H0645178 B2 | 6/1994 |
| JP | 2780367 B2 | 7/1998 |

OTHER PUBLICATIONS

EP Extended Search Report for EP Application No. 14711106.0 dated Feb. 27, 2015, 14 pages.

European Extended Search Report mailed Feb. 27, 2014, 14 pages.

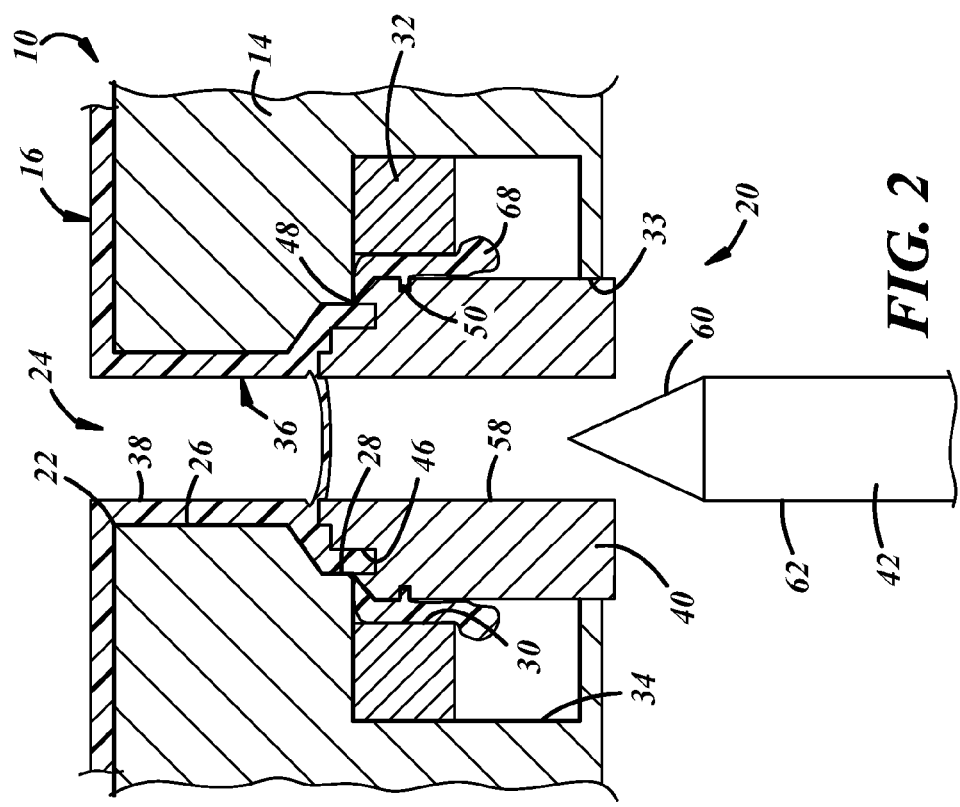
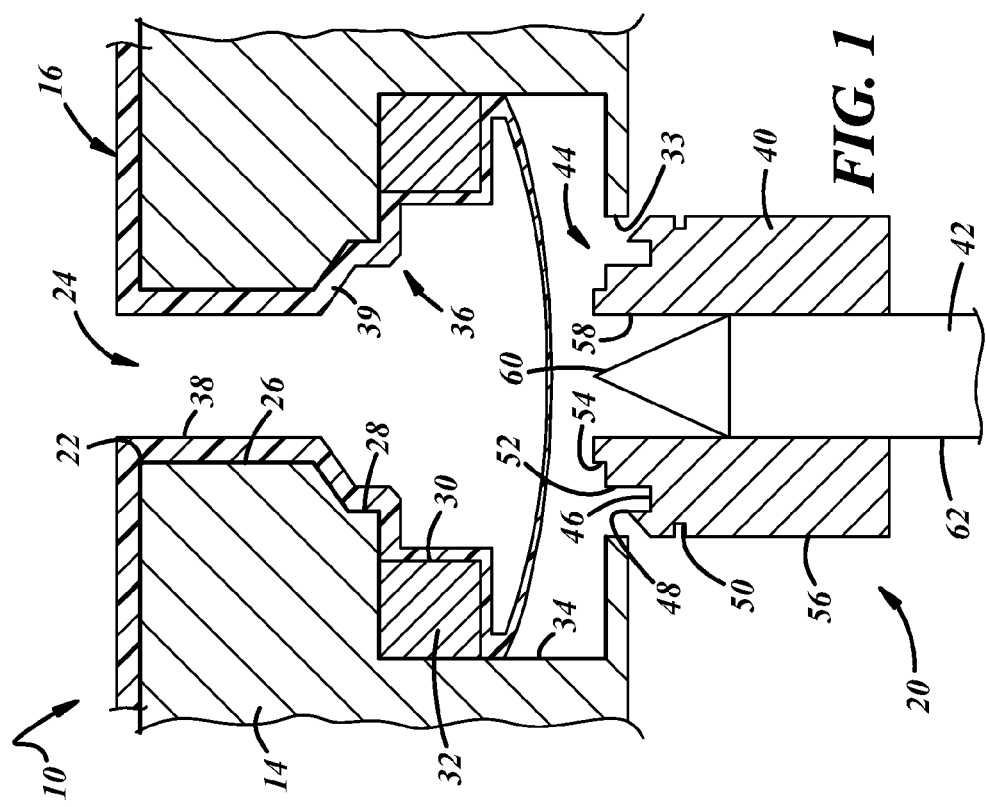

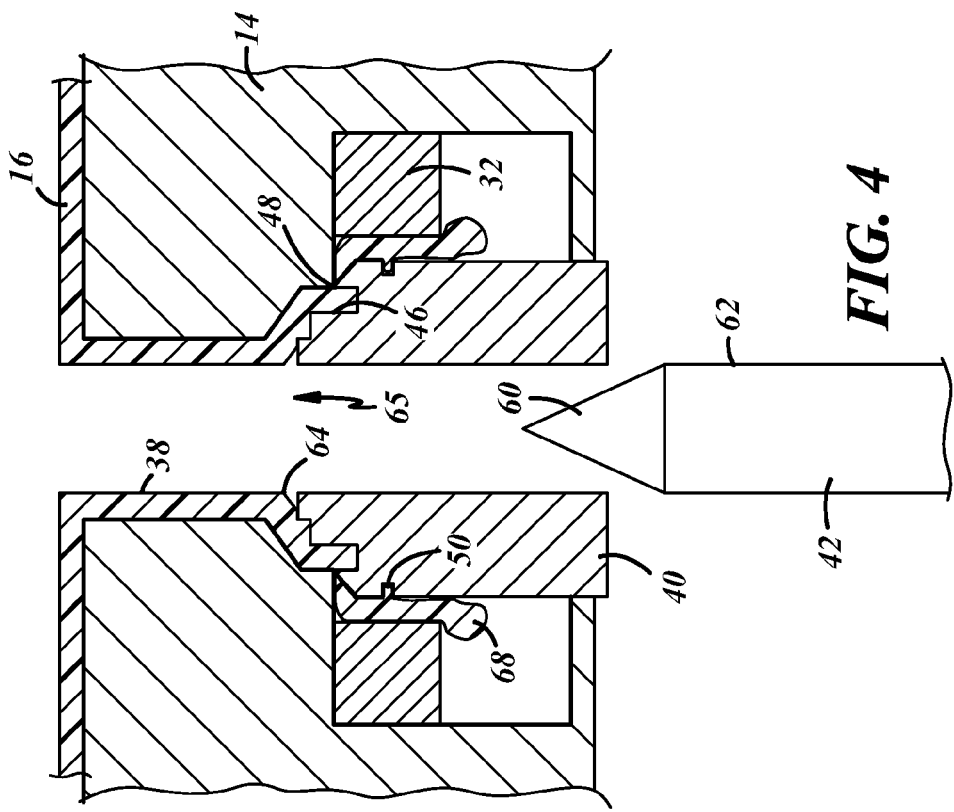
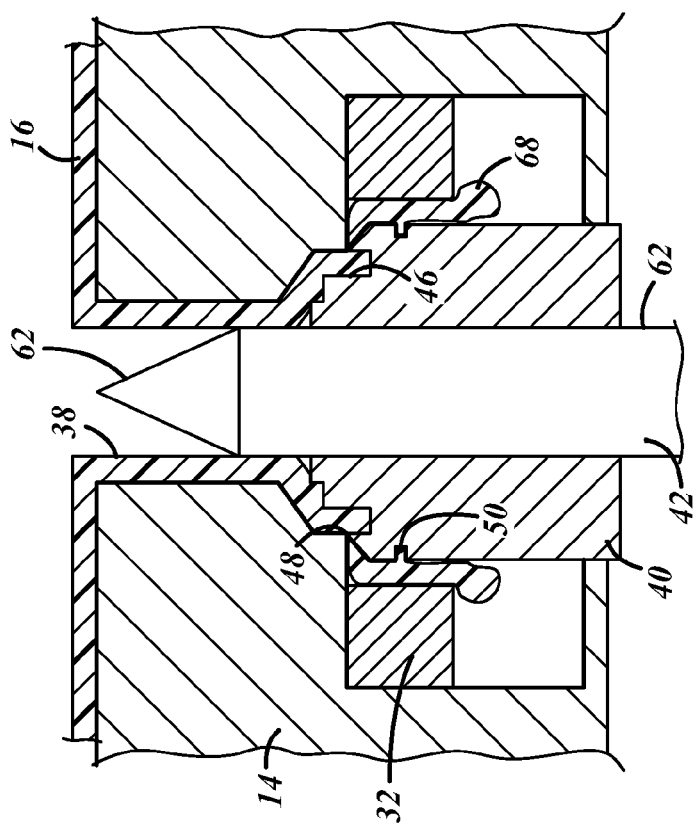
FIG. 3
FIG. 4

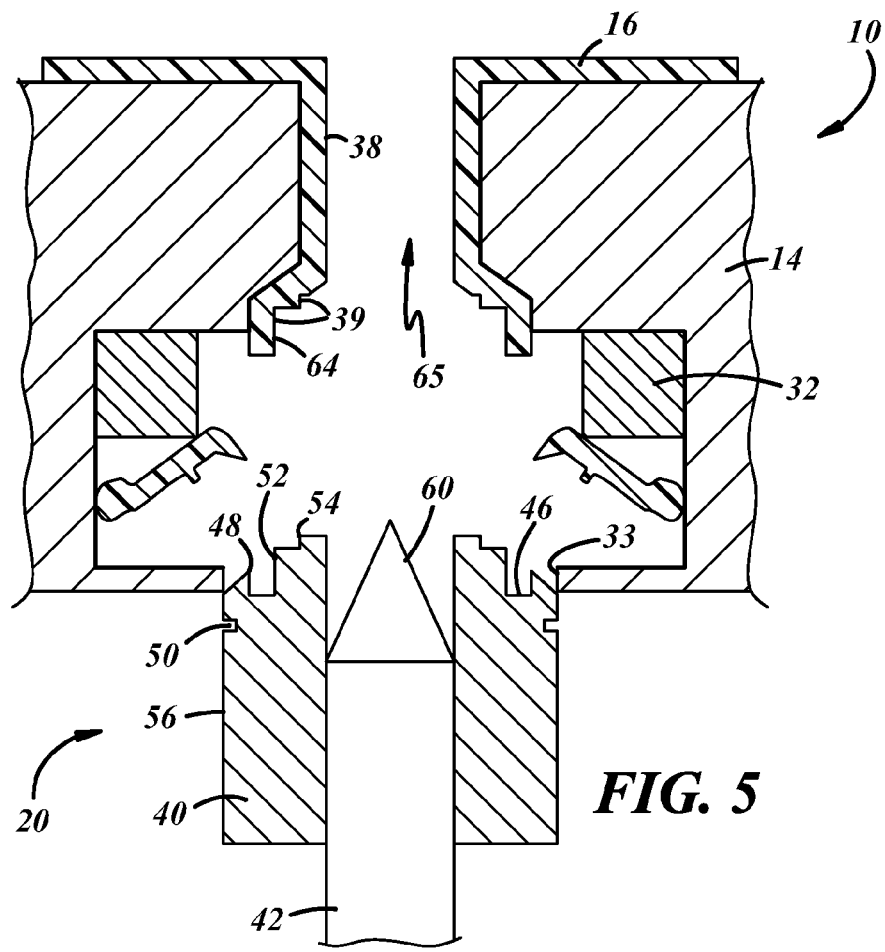
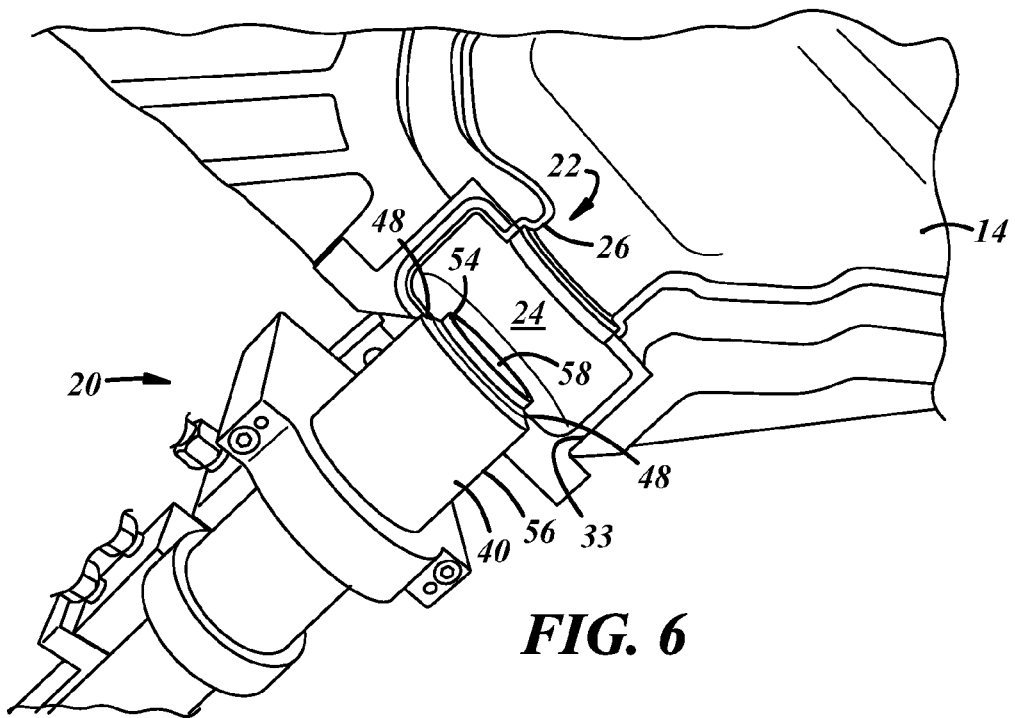

RECEPTACLE WITH MOUNT FEATURE

REFERENCE TO CO-PENDING APPLICATION

This is a Continuation-in-Part of U.S. patent application Ser. No. 13/116,390 filed May 26, 2011, which is incorporated herein, by reference, in its entirety.

TECHNICAL FIELD

The present disclosure relates generally to the manufacture of a receptacle.

BACKGROUND

Receptacles may include components within their interior volume, or connected to their exterior. For example, fuel tanks for vehicles typically include a fuel filler pipe connected to the tank and through which fuel is added to the tank. The receptacle may also include components mounted on a carrier or other support that is placed in the fuel tank, or the components may be attached to a flange that is secured on an already formed fuel tank wall, such as by a clamp or weld.

SUMMARY

A method for forming a receptacle may include providing a mold having a forming surface and a recessed area defining part of the forming surface, the mold having sections that may be separated to open the mold and closed together to close the mold. A molten plastic parison may be provided into the mold when the mold is open, the mold may be closed and the parison may be expanded against the forming surface so that a portion of the parison enters the recessed area. The portion of the parison within the recessed area may be formed by moving a secondary forming feature relative to the mold and parison to define a mount feature.

Another method for forming a receptacle may include providing a mold having a forming surface, and a passage and a counterbore open to the passage with both the passage and counterbore defining part of the forming surface, the mold having portions that may be separated to open the mold and closed together to close the mold. Providing a molten plastic parison into the mold when the mold is open, closing the mold and expanding the parison against the forming surface so that a portion of the parison enters the passage and counterbore. The method may further include forming the portion of the parison within the passage by moving a main body relative to the mold and into a portion of the parison adjacent to the counterbore to define a mount feature between the main body and the mold where the main body defines part of the forming surface against which the parison is formed to define the receptacle.

BRIEF DESCRIPTION OF THE DRAWINGS

The following detailed description of exemplary embodiments and best mode will be set forth with reference to the accompanying drawings, in which:

FIG. 1 is a diagrammatic, fragmentary sectional view of a portion of an apparatus for forming a plastic receptacle showing a portion of a mold for forming the receptacle and a secondary forming feature for forming a mount feature on the receptacle;

FIG. 2 is a view similar to FIG. 1 showing the secondary forming feature in a second position with a main body advanced and forming the mount feature;

FIG. 3 is a view similar to FIG. 1 showing the secondary forming feature in a third position with a pin advanced relative to the main body and piercing a hole in the material of the receptacle;

FIG. 4 is a view similar to FIG. 1 showing the secondary forming feature in a fourth position with the pin retracted;

FIG. 5 is a view similar to FIG. 1 showing the secondary forming feature in a fifth position with the main body retracted;

FIG. 6 is a fragmentary perspective view of a tool that may include a secondary forming feature and showing a fragmentary sectional view of a portion of a mold for forming the receptacle;

DETAILED DESCRIPTION OF PRESENTLY PREFERRED EMBODIMENTS

Figure 7:
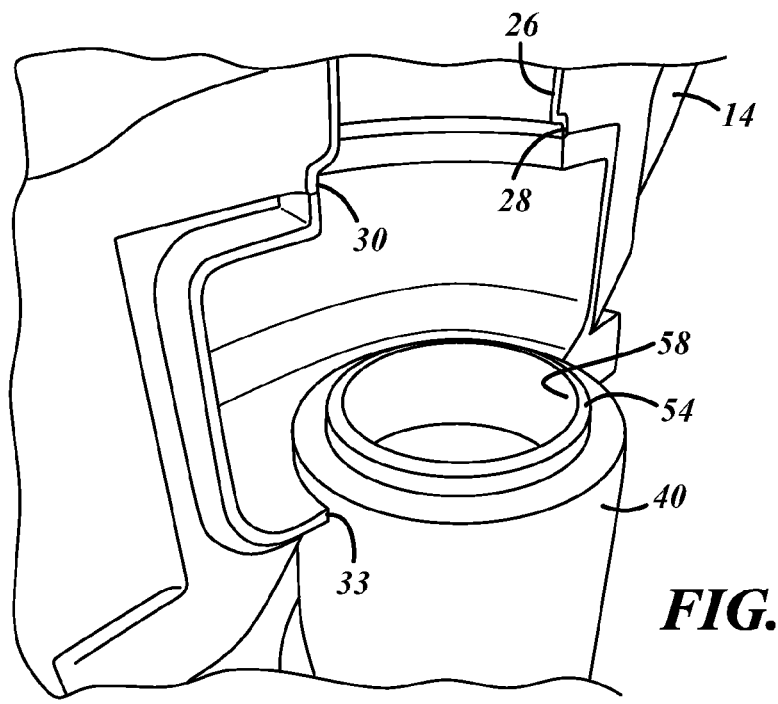
FIG. 7 is an enlarged, fragmentary view of the tool and mold shown in FIG. 6.
Figure 8:
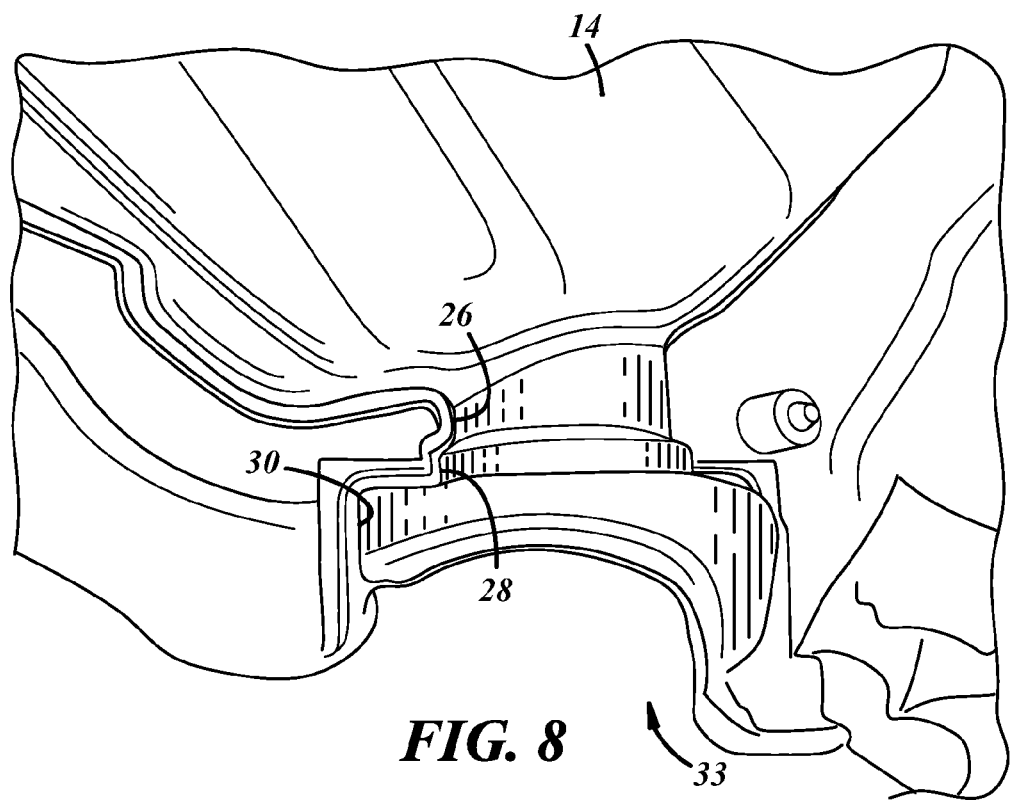
FIG. 8 is an enlarged, fragmentary view of a portion of the mold shown in FIGS. 6 and 7.
Figure 9:
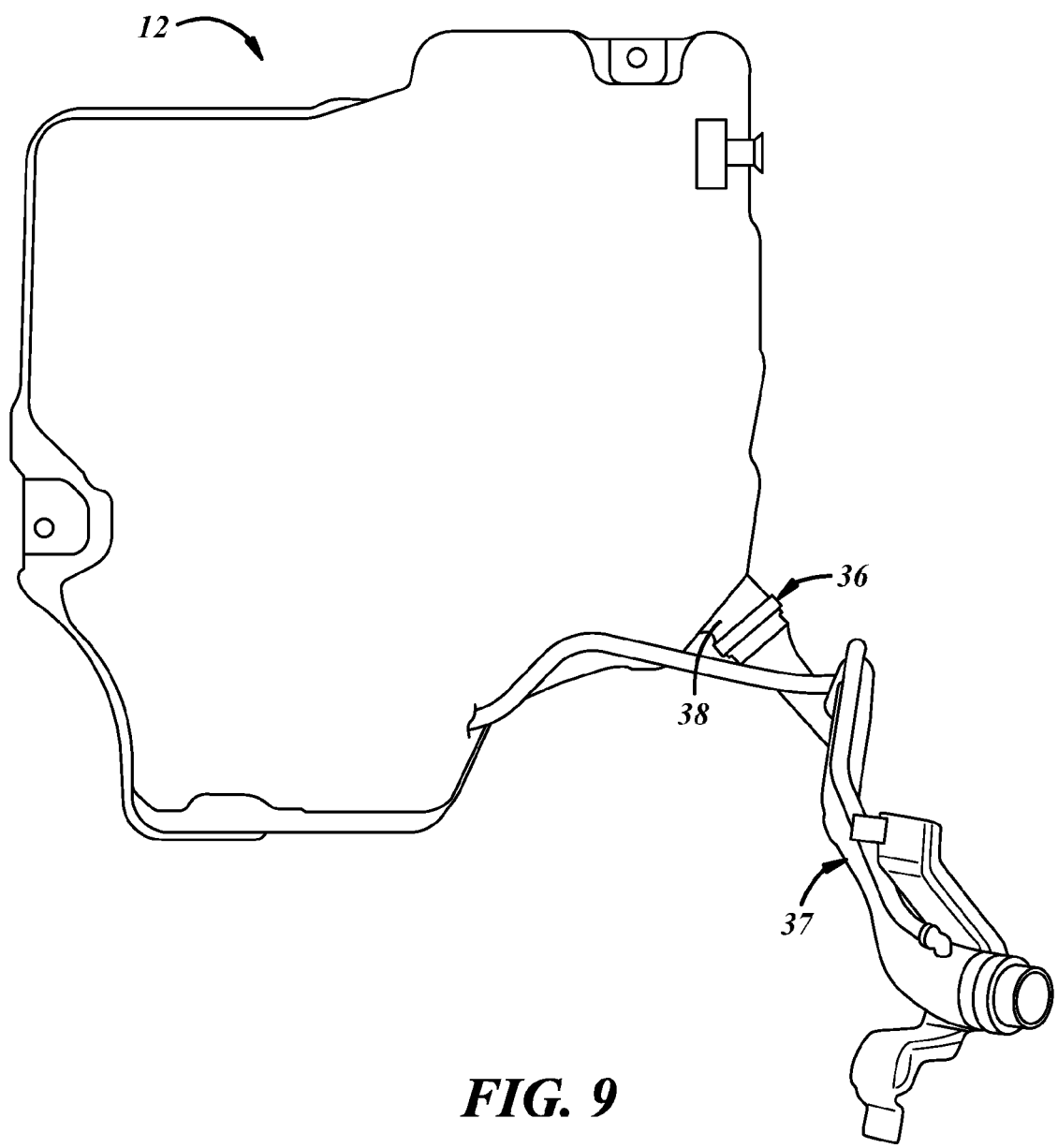
FIG. 9 is a plan view of a fuel tank having a fuel filler neck attached to a mount feature of the fuel tank.

Referring in more details to the drawings, FIGS. 1-8 illustrate an apparatus 10 and method for forming a plastic receptacle 12 (FIG. 9). The receptacle 12 may include a hollow interior and may be formed, by way of one example, by a blow molding process. In such a process, a molten parison 16 of plastic material may be positioned within a mold having one or more mold sections 14 that collectively define a cavity contoured to define a desired exterior shape of the receptacle 12. One or more mold sections 14 may be movable relative to other mold sections 14 to open the mold and permit the parison 16 to be received into the cavity. Thereafter, the mold sections 14 may be closed together to define a substantially complete enclosure. When the mold sections 14 are closed together, fluid, such as air, may be provided under pressure and within the interior of the parison 16 to expand the parison into engagement with the mold cavity.

During the molding process, the parison material may be cut, torn or otherwise split to permit access to the interior of the receptacle before it is finally cooled and formed. With the mold sections 14 opened or separated to expose the interior of the partially formed receptacle 12, various devices may be inserted into the interior of the receptacle and then the mold sections 14 may be closed to rejoin the portions of the receptacle and permit the receptacle 12 to be further formed or cooled to define, in at least some implementations, a substantially complete enclosure in which a liquid may be received. The liquid may include, but is not limited to, fuel such as may be used in an automotive vehicle to power an internal combustion engine.

The parison 16 used to form the receptacle 12 may include multiple layers of different materials. The layers may be co-extruded and may provide different properties or characteristics to the receptacle, if desired. In the example of an automotive fuel tank, the receptacle 12 or tank may be formed from one or more structural layers (e.g. HDPE), a vapor barrier layer (e.g. EVOH) and one or more adhesive layers to facilitate bonding together the structural and vapor barrier layers. A general receptacle molding process and an exemplary receptacle that may be formed thereby is disclosed in U.S. patent application Ser. No. 12/491,964 filed Jun. 25, 2009, the disclosure of which is incorporated herein, in its entirety, by reference.

In more detail, FIGS. 1-5 illustrate a portion of a mold assembly for forming a receptacle 12 and a secondary forming feature 20. The mold assembly may include one or more mold sections 14 (sometimes two sections or halves) that have a cavity defined by an inner forming surface adapted to be engaged by the exterior of the material forming the receptacle, and an opening 22. The opening 22 may extend to or be defined in part by a recessed area 24 which may define a passage 26. The recessed area 24 may also include a first counterbore 28 open to the passage 26 which may in turn lead to a second counterbore 30. An insert 32 may be disposed within the second counterbore 30. The insert 32 may be annular and may define at least part of the second counterbore 30, and also provide a step 34 downstream (spaced further from the forming surface) of the insert 32. In this exemplary implementation, the material of the parison 16 is forced into the passage 26 and against the inner surface of the passage 26 and counterbores 28, 30, as shown in FIG. 1. An opening 33 may be provided in the mold sections 14 to permit movement of at least a portion of the secondary forming feature into, out of and/or relative to the mold sections 14.

The recessed area, which may include the passage 26 and counterbores 28, 30 (see also FIGS. 6-8), as shown, may define in the parison 16, and eventually, in the finally formed receptacle 12, a mount feature 36 to which a component may be connected to the receptacle 12 after the receptacle 12 is formed. In one implementation, the mount feature 36 includes a fill spud formed in one piece with the receptacle 12, as an integral part thereof, and having an elongated neck 38 defined by the passage 26 and connection features or shoulders 39 defined by the counterbores 28, 30. In use, a filler neck 37 (FIG. 9) may be coupled to the fill spud and liquid may be provided into the receptacle 12 through the filler neck and fill spud. Other mount features 36 may receive one or more valves (like vent valves, roll-over valves) or tubes/conduits through which liquid and/or vapor may be routed. The connection features may provide shoulders or other contours that facilitate physical connection of a component to the receptacle 12, such as by a clamp, weld, adhesive or the like.

The secondary forming feature 20 may be provided as part of, or separate from the mold 14 and related apparatus used to form the receptacle 12. The secondary forming feature 20 may be used, if desired, to further form the mount feature 36 during formation of the receptacle 12. In the implementation shown, the secondary forming feature includes a main body 40 and a pin 42.

The main body 40 may be moved from a first (retracted) position to a second (advanced) position, and it may be moved independently of the movement of the mold sections 14. In its first position, shown in FIG. 1, the main body 40 may be spaced further from the passage 26 and counterbores 28, 30 than when the main body 40 is in its second position, shown in FIG. 2. In its second or advanced position, the main body 40 may engage a portion of the parison 16 and further form the parison material against the adjacent surfaces within the mold 14 (shown here as the counterbores 28, 30). In the implementation shown, the main body 40 moves in a linear path that is parallel to an axis of the passage 26. Of course, the main body 40 may move along a path that is not linear, and the path may be oriented in any desired way relative to the passage 26 (e.g. it need not be parallel thereto). The main body 40 could be driven by a pneumatic, electric, hydraulic or other actuator.

To form the parison 16 as desired, the main body 40 may include a head 44 facing the recessed area 24 and having forming features of a desired size, shape and orientation. In the implementation shown, the head 44 includes an annular, generally axially extending recess 46, a cutting or severing edge 48, a connecting feature 50, and one or more stepped annular rims 52, 54 defining radially and axially stepped surfaces in the parison 16 and final receptacle 12. The recess 46 and rims 52, 54 define steps or shoulders in the receptacle material which may be engaged by a similarly shaped component to radially and axially overlap portions of the component and facilitate a strong connection between the mount feature 36 and the component. In the implementation shown, the connecting feature includes one or more voids, such as a peripheral groove 50 extending radially inwardly of a side surface 56 of the main body 40. This groove 50 is adapted to receive some of the parison material to facilitate a physical connection between that material and the main body 40. The head 44 and main body 40 may be annular providing a passage 58 through which the pin 42 may extend.

The pin 42 may have a cutting or piercing end 60 and a cylindrical body 62. The pin 42 may be received within the passage 58 and may be moved from a first or retracted position shown in FIG. 1 to a second or advanced position such as is shown in FIG. 3. In its retracted position, the pin 42 may be spaced from and not engaged with the parison material. In its advanced position, the pin 42 may engage any material spanning the passage 58 of the main body 40 or the passage 26 or counterbores 28, 30 of the mold 14. The pin 42 may displace (e.g. pierce, push aside or otherwise move/remove) the material spanning or blocking a portion of the passage 26 or 58 to define an opening 64 (FIGS. 4 and 5) in the parison and receptacle 12. That opening 64 may be aligned with or otherwise in communication with the passage 26 in the mold 14 so that the mount feature 36 includes an open passage 65 to the interior of the receptacle 12. The pin 42 could be driven separately or with the main body 40. Pressurized fluid could be provided through the pin 42, if desired, to further blow mold or form the receptacle 12, to hold the parison 16 against the forming surface, and/or to facilitate cooling of the parison/receptacle material.

To form the mount feature 36, the mold sections 14 may be opened and a molten parison 16 may be received within the mold, the mold sections 14 may be closed, and the parison 16 may be expanded into and against the forming surface of the mold sections 14. Some of the parison material may enter into the passage 26 and counterbores 28, 30 as shown in FIG. 1. As or after the parison 16 is expanded, the main body 40 may be moved from its first position to its second position, as shown in FIGS. 1 and 2. During this movement, the leading end or head 44 may engage some of the parison material, which still is at least somewhat molten, and move that material back toward the passage 26. The parison material may fill the recess 46 and conform to the other features (such as rims 52, 54) on the head 44. In its fully advanced position, the cutting edge 48 may engage the mold sections 14 or nearly so, to sever or at least thin out and weaken a portion of the parison material. In addition to, or instead of, the cutting edge provided on the head 44, an edge or other feature could be provided on the mold sections 14. The remainder of the head 44 may be spaced from the mold sections 14 to provide a desired thickness of the mount feature 36, and its various features (steps, counterbores, etc).

A gap between the sidewall 56 of the main body 40 and the insert 32 may also be filled with or contain material of the parison 16. This material may be outboard of the cutting edge 48 and may define scrap material 68 when the process is complete. Some of this scrap material 68 may fill at least some of the peripheral groove 50, and the insert 32 may be sized to ensure that scrap material enters the groove 50. Accordingly, in the fully advanced position of the main body 40, a portion of the parison may be trapped between the main body 40 and both the mold sections 14 and the insert 32 to provide a desired configuration of the mount feature 36. Some of the parison material may span the passage 58 of the main body 40 and thereby block or close all or a portion of the passage 26 of the mold.

As shown in FIG. 3, to open up the passage 26 of the mold and further define an open, annular, generally cylindrical neck of the mounting feature 36, the pin 42 may be moved to its advanced position to displace the material spanning or at least partially blocking the passage 26. Some of this material may be forced outwardly and pressed into the neck 38 with other material in that area. When the pin 42 is retracted, as shown in FIG. 4, the passage 65 is open, providing access to the interior of the formed receptacle 12 through the mount feature 36.

After, or at the same time as, the pin 42 is retracted to its first position, the main body 40 may be retracted toward its first position. During this movement, the scrap material 68 may be torn and separated from the remainder of the parison 16, or, if the scrap material 68 was already separated from the parison 16 by the cutting edge 48, the scrap material 68 may be moved away from the mount feature 36 due to the connection of the scrap material 68 to the main body 40, for example, via the groove 50. In other words, as the main body 40 is axially retracted, the scrap material 68 is connected thereto by way of the groove 50 (or some other feature) and so the scrap material 68 is also pulled or moved away from the mount feature 36.

Because, in the implementation shown, the counterbores 28, 30 are larger in diameter than the diameter of the passage 26, the mold sections 14 preferably open along a plane extending through the passage 26 and counterbores 28, 30 to facilitate removal of the receptacle 12 from the mold. In this way, a portion of the passage 26 and the counterbores 28, 30 may be formed in different mold sections 14 so that portions of the passage 26 are separate from each other when the mold is opened and the passage is defined again when the mold is closed to form the receptacle. Further, scrap material 68 removed from the mount feature 36 can be removed from the mold when the mold is opened.

In the example of a multi-layer parison material, such as in an automotive fuel tank application, the mount feature 36 may also be formed from the same multi-layer material as the rest of the receptacle. Desirably, this means that a vapor barrier layer may extend throughout the mount feature 36, even to the exposed face or free end of the mount feature 36, to limit or prevent vapor permeation through the mount feature.

Further, when the main body 40 is advanced toward its second position, the material that spans the passage 26 is pushed or folded into material already lining the passage 26 and counterbores 28, 30 to provide a double layer of the parison material, where each of the double layers includes multiple layers of material. This provides two vapor barrier layers in that area of the mount feature 36 which may further reduce or help prevent vapor permeation therethrough. This also exposes the outer layer of material at the free end of the mount feature 36 to facilitate welding or otherwise connecting a component to the mount feature. This may also reduce or eliminate the risk of delamination of the inner or middle layers of the multi-layer parison material. Previously, to provide a contoured neck or mount feature, the inner layer of material was displaced outwardly around a blow pin which exposed the inner layer of material to which a component could be welded. Additionally, use of the blow pin limited the position of the mount feature to being between the mold sections, and at a bottom side of the mold. With the secondary forming feature, flash can be reduced significantly, the mount feature can be formed independently of the position of the blow pin (so a mount feature may be provided in a side or top of the mold), and multiple mount features can be formed on a tank. Of course, this list of possibilities is not all inclusive and any combination or none of these possibilities might be achieved in a particular implementation.

Still further, the head 44 may provide a desired geometry, which may be relatively complex, for the mount feature 36 while still maintaining sufficient wall thickness in that area to facilitate welding or otherwise attaching a component to the receptacle 12. The improved thickness even with an elongated neck 38 in a mount feature and may provide greater flexibility in the shapes and sizes of mount features 36 that can be formed without unduly thinning out the material in that area. Further, the secondary forming feature 20 may include the main body 40 and pin 42 as a single unit to facilitate tooling changes—that is, these components may be removed and installed as a single unit, if desired.

Figure 10:
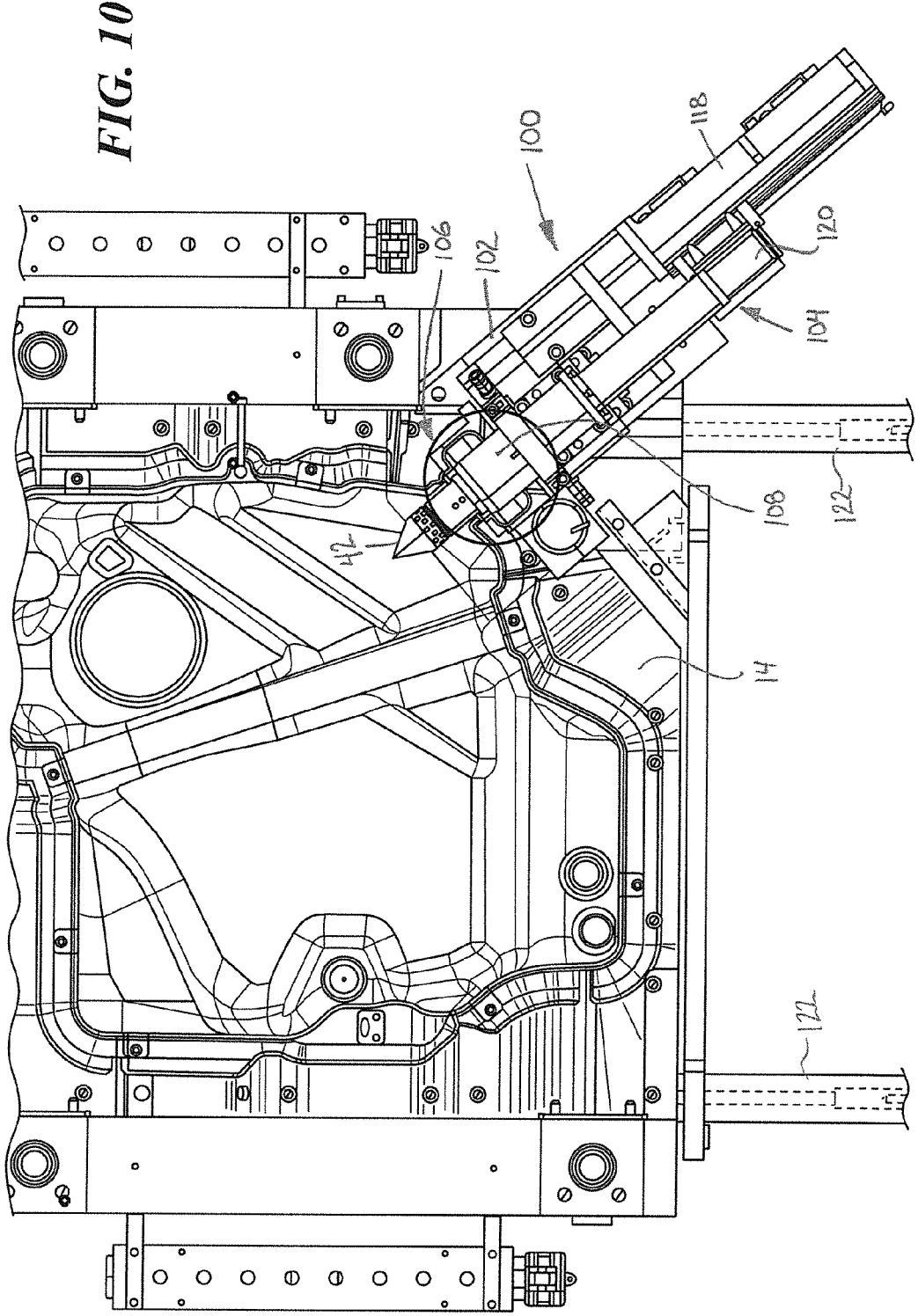
FIG. 10 is a side view of the inside of a mold half showing a neck forming apparatus carried by the mold half.
Figure 11:
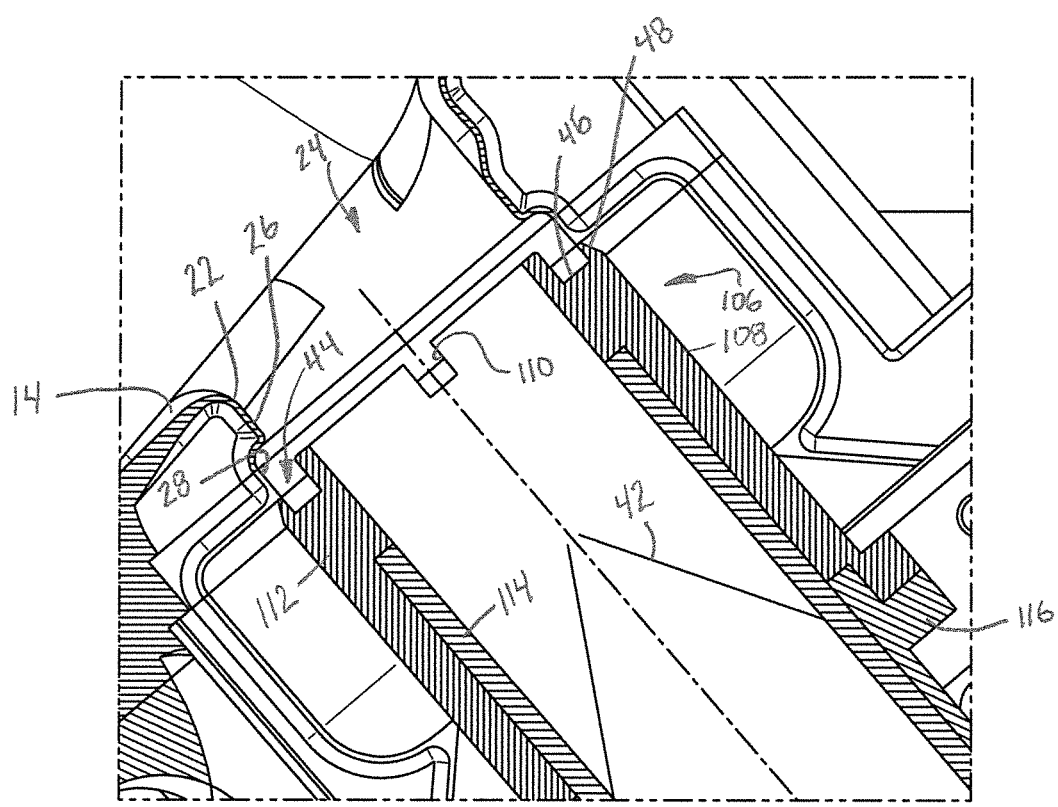
FIG. 11 is a fragmentary sectional view of a portion of the mold and a tool including a secondary forming feature and blow pin.

FIGS. 10 and 11 illustrate a secondary forming feature 100 that is carried by one or both mold sections 14 (only one of two mold halves is shown in FIGS. 10 and 11). To facilitate description and reference to the drawings, the same reference numbers are used in these figures as in prior figures where the components are the same or similar. As shown, the secondary forming feature 100 is carried by one mold section 14. In this non-limiting example, the secondary forming feature 100 includes a housing 102 that is fixed, such as by one or more mechanical fasteners like bolts or machine screws, to a periphery or support portion of a mold section 14. Hence, the secondary forming feature 100 is directly carried by at least one mold section rather than supports 122 for the mold sections, or separate support structure for the secondary forming feature. And the secondary forming feature 100 moves as the mold section to which it is connected moves (if the particular mold section moves during the receptacle forming process).

An actuator assembly 104 is carried by the housing 102 as is a tool 106 that is driven by the actuator assembly 104. The tool 106 may include a main body 108 and a pin 42 slidably received within the main body 108. The pin and main body may be as described with regard to FIGS. 1-8, or of any other suitable construction and arrangement. In the example shown, the main body includes a void 110, shown as an open-ended slot or notch, formed in its sidewall, in the area of the recess 46. The void 110 is filled with parison material during the receptacle forming process and defines a corresponding protrusion in a mount feature of the receptacle. The protrusion may aid in mounting a component to the mount feature, may provide an anti-rotation feature for a component mounted to the mount feature, and/or may aid in retaining a component on the mount feature, among other possible uses. The head 44 and its features (e.g. recess 46, edge 48, etc) may be provided in a serviceable and/or replaceable part, shown in FIG. 11 as a sleeve 112 fitted onto an inner tube 114 and collar or connector 116. As shown, a distal end of the sleeve 112 may be coupled to the collar 116, such as by mating threads. Hence, should the head 44 become worn, it may be readily replaced without having to replace any significant portion of the secondary forming feature 100.

The actuator assembly 104 may include, by way of examples without limitation, a hydraulic or pneumatic apparatus designed to displace relative to the mold section both the main body 108 and the pin 42. Two actuators may be provided in the assembly 104 with a first actuator 118 coupled to the main body 108 and a second actuator 120 coupled to the pin 42. In this way, the main body and pin may be driven independently or relative to each other—they need not move together, in unison.

In one example, the main body 108 may initially be moved relative to the mold 14 to initially form a neck or other feature on a receptacle being formed in the mold section, and the pin 42 may thereafter be moved relative to the main body 108 and the mold section 14. Of course, all or a portion of this movement may occur simultaneously, if desired. The pin 42 may pierce an opening in the receptacle and fluid, such as pressurized air or other gas, may be introduced into the receptacle through the pin, as described above.

By mounting the secondary forming feature 100 and its actuator assembly 104 directly on the mold in which a receptacle is formed, the necessity to maintain and control the alignment of the secondary forming feature relative to the mold sections is eliminated and any support structure for these devices that is separate from the molds also can be eliminated. Further, the tool and actuator(s) can be more easily serviced and changed out as desired. Cycle times may also be reduced as the accurately aligned secondary forming feature need not be advanced or retracted relative to the mold section and is in position and ready for actuation whenever the mold sections are closed or nearly closed during normal movement of the mold sections to form a receptacle. That is, there is no relative movement between the secondary forming feature as a whole and the mold section to which it is fixed. With a forming feature not mounted to a mold section, the mounting feature may require movement relative to the mold sections which requires an extra step in the forming process and an increase in the time and complexity of the process to form a receptacle.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. An apparatus for forming a molded receptacle, comprising:
   a mold having mold sections movable between two positions to define an open position of the mold and a closed position of the mold, defining a forming surface against which the receptacle is formed, and having a recessed area that defines part of the forming surface;
   a secondary forming feature carried by at least one of the mold sections and having a body movable relative to at least one mold section and having a head that defines part of the forming surface of the mold against which a portion of the receptacle is formed, the head facing the recessed area and movable from a first position retracted from the recessed area and a second position advanced adjacent to the recessed area to form a portion of the receptacle; and
   a pin carried by the secondary forming feature, the pin being movable relative to the body between a first position and a second position wherein an end of the pin extends beyond the body, wherein the secondary forming feature includes a housing carried by a mold section, an actuator that moves the body relative to the mold section to which the housing is fixed and is carried by the housing, and a second actuator that moves the pin relative to the body and wherein said second actuator is carried by the housing.

2. The apparatus of claim 1 wherein the head includes a connection feature open to the exterior of the body and adapted to receive a portion of the material from which the receptacle is molded to connect the body to said portion of the material.

3. The apparatus of claim 2 wherein said portion of the material defines scrap material and movement of the body away from its second position toward its first position carries at least some of the scrap material with the body away from the recessed area.

4. The apparatus of claim 1 wherein the body includes a passage in which the pin is received.

5. The apparatus of claim 1 wherein the secondary forming feature includes a housing and the housing is fixed to a mold section.

6. The apparatus of claim 5 wherein the secondary forming feature includes an actuator that moves the body relative to the mold section to which the housing is fixed, and the actuator is carried by the housing.

7. An apparatus for forming a molded receptacle, comprising:
   a mold having mold sections movable between two positions to define an open position of the mold and a closed position of the mold, defining a forming surface against which the receptacle is formed, and having a recessed area that defines part of the forming surface;
   a secondary forming feature having a housing fixed to at least one of the mold sections and having a body movable relative to at least one mold section and a pin also movable relative to at least one mold section, the body having a head that defines part of the forming surface of the mold against which a portion of the receptacle is formed, the head facing the recessed area and movable from a first position retracted from the recessed area and a second position advanced adjacent to the recessed area to form a portion of the receptacle, and the pin being movable relative to the body;
   an actuator to move the body and wherein the actuator is carried by the housing, and an actuator to move the pin and wherein the actuator is carried by the housing.

8. The apparatus of claim 7 wherein the housing is fixed to a mold section by mechanical fasteners.

* * * * *